United States Patent Office 2,761,788
Patented Sept. 4, 1956

2,761,788
HEAT-STABILIZED, PLASTICIZED CELLULOSE ACETATE

William Geoffrey Lowe, Spondon, near Derby, England, assignor to British Celanese Limited, a corporation of Great Britain No Drawing. Application November 19, 1951,
Serial No. 257,195
Claims priority, application Great Britain
November 29, 1950

3 Claims. (Cl. 106—176)

This invention has as its object improvement of the heat-stability of plasticisers containing combined chlorine and of compositions containing cellulose acetate or other acid-sensitive thermoplastics, together with such plasticisers. The term "acid-sensitive" is not meant to imply that the thermoplastic must be sensitive to all acids. It is used to characterise thermoplastics which, like cellulose acetate, tend to undergo degradation when heated in the presence of strong (i. e. highly ionised) inorganic acids.

As a plasticiser for cellulose acetate tri-(beta-chlorethyl) phosphate (referred to below as "trichlorethyl phosphate") possesses several very important advantages. It has a very high solvent power for cellulose acetate and is a most valuable non-inflammator therefor. Its water resistance is high and it is well retained in cellulose acetate compositions. It has, however, a serious disadvantage in that when cellulose acetate compositions containing it are subjected to high temperatures, as in injection moulding, degradation of the cellulose acetate, indicated by viscosity loss and colour development tend to occur.

I have found that when trichlorethyl phosphate is exposed by itself to temperatures such as are used in moulding cellulose acetate, it tends to develop acidity and to lose chlorine, probably in the form of hydrochloric acid. This slight decomposition probably accounts for the degrading effect on cellulose acetate, which is known to be sensitive to acid at high temperatures. Attempts were, therefore, made to find a substance that, when added to the trichlorethyl phosphate, would suppress the development of acidity. Many substances were investigated, including metal soaps and other heavy-metal salts of slightly alkaline reaction, weak nitrogenous organic bases such as urea and its substitution derivatives, adipic dihydrazide and diphenyl acetamidine, anti-oxidants such as hydroquinone and beta-phenyl naphthylamine, and unsaturated substances such as diallyl phthalate and alkyl tetrahydrophthalates. With none of these substances was any substantial improvement obtained, and with some of them, as will be shown below, the development of acidity was actually increased. Finally, it was found that a valuable stabilising effect could be obtained in the trichlorethyl phosphate and in cellulose ester compositions containing it, by the incorporation of a compound carbon, hydrogen and oxygen that contains an epoxy group, e. g. phenoxy propylene oxide or other glycidyl ether (or a glycidyl ester) of a phenol or an alcohol of relatively high molecular weight, e. g. a di- or poly-glycol. It was also found that besides trichlorethyl phosphate, other compounds containing halogen and hydrogen attached to adjacent carbon atoms, that are stable at atmospheric temperatures but tend to lose halogen when kept at a temperature between 100 and 250° C. can be protected to a considerable extent against such change by the same method.

In the course of the investigation referred to above, some epoxy compounds that are believed to be new were synthesised. The invention includes these compounds as such as well as their preparation, the method of stabilisation referred to, and compositions containing halogen compounds of the kind specified together with an epoxy compound of the kind specified, with or without a cellulose ester.

The following Table I illustrates the effect of a number of substances typical of different chemical classes on the development of acidity by trichlorethyl phosphate when heated at 200° C. for 15 minutes. In each test except the first, in which the phosphate was heated alone, 1% based on the weight of the phosphate, of the substance under test, was incorporated with the phosphate. The acidity is expressed as grams of caustic soda required to neutralise 100 grams of the heated sample. The initial acidity of the phosphate expressed in this way was 0.006.

TABLE I

| Substance added | Colour Developed | Acidity |
|---|---|---|
| None | Slight | 0.26 |
| Diphenyl acetamidine | Deep | 0.74 |
| Adipic dihydrazide | Very deep | (¹) |
| Hydroquinone | Slight | 0.40 |
| Diallyl phthalate | ___do___ | 0.15 |
| Phenoxy propylene oxide | ___do___ | 0.017 |

¹ Could not be measured on account of the darkness and turbidity of the solution.

The following Table II illustrates the effect on the heat stability of a cellulose acetate composition in which the plasticiser is trichlorethyl phosphate, of incorporating small proportions of various epoxy compounds with the plasticiser. The compositions contained 30% by weight of the plasticiser. They were moulded into discs by a standard procedure and the discs were then exposed to a temperature of 200° C. for the times specified. The discs were dissolved in acetone under standard conditions and the viscosities of the solutions were determined and compared in each case with that of a solution made in the same way from a disc that had not been exposed to the heat-treatment after moulding. The results are expressed at "percent viscosity loss" as given by the formula:

$$\text{Percent viscosity loss} = \frac{A-B}{A-C} \times 100$$

where:
$A$ = viscosity of the solution from the unexposed disc
$B$ = viscosity of the solution from the exposed disc containing epoxy compound, and
$C$ = viscosity of the solution from the exposed disc containing no epoxy compound.

It will be appreciated that the greater the stabilising effect of the epoxy compound the lower will be the "percent viscosity loss." The percentages of stabiliser are based on the weight of the trichlorethyl phosphate.

TABLE II

| Trial No. | Stabiliser | Time of Exposure mins. | "Percent viscosity loss" |
|---|---|---|---|
| 1 | 2% phenoxy propylene oxide | 10 | 13 |
| 2 | 3% phenoxy propylene oxide | 15 | 13 |
| 3 | 5% phenoxy propylene oxide | 15 | 9 |
| 4 | 5% p-octyl phenoxy propylene oxide | 15 | 46 |
| 5 | 5% xylenoxy propylene oxide | 10 | 39 |
| 6 | 5% cresoxy propylene oxide | 10 | 50 |

The p-octyl phenoxy propylene oxide was made by dissolving 1 gm. mole of p-octyl phenol in a solution of 1.25 gm. moles of caustic soda in 2 litres of a 50% (by volume) mixture of ethanol and water at 30 to 40° C., gradually adding 1 gm. mole of epichlorhydrin with vigorous stirring, allowing the reaction mixture to stand overnight, extracting with ether, distilling off the ether, continuing the distillation under vacuum, and collecting the fraction boiling at 182 to 184° C. under 10 mm. pressure.

The xylenoxypropylene oxide was made in a similar way to the p-octyl derivative, from commercial xylenol, the fraction boiling at 146 to 156° C. at 14 mm. being collected.

Similarly the cresoxypropylene oxide was made from a commercial mixture of cresols and the fraction boiling at 135 to 140° C. under 10 to 15 mm. was collected. The p-octylphenoxy and xylenoxy propylene oxides are thought to be new substances and are claimed as such.

The following are examples of cellulose acetate compositions according to the invention. All the parts are by weight.

Example I 68 parts of cellulose acetate
7 parts of triphenyl phosphate
16 parts of trichlorethyl phosphate
0.8 part of phenoxy propylene oxide Example II 66 parts of cellulose acetate
7 parts of wood flour
17 parts of dimethyl phthalate
16 parts of trichlorethyl phosphate
0.8 part of phenoxy propylene oxide Example III 67 parts of cellulose acetate
7 parts of wood flour
32 parts of trichloroethyl phosphate
1.5 parts of phenoxy propylene oxide Example IV 65 parts of cellulose acetate
7 parts of triphenyl phosphate
14 parts of dimethyl phthalate
13 parts of trichloroethyl phosphate
6.5 parts of phenoxy propylene oxide.

The compositions of Examples I to III are moulding compositions, those of Examples II and III containing a filler to give higher impact strength, and the composition of Example IV is for making sheet material by the block-slicing method. In all these compositions a substantial improvement in resistance to the degrading effect of heat is achieved.

In these examples the phenoxy propylene oxide can be replaced by:

p-Octylphenoxy propylene oxide;
o-, m- or p-Cresoxy propylene oxide or a mixture of any two or of all these cresoxy derivatives;
Any of the xylenoxy propylene oxides or a mixture of two or more of them; or
The diglycidyl ether of diethylene glycol.

It might have been expected that phenoxy propylene oxide the boiling point of which is 243° C., would be too volatile at moulding temperatures to be useful. Table II shows, however, that even at 200° C., which is higher than the usual injection-moulding temperature for cellulose acetate, a valuable degree of stabilisation is obtained with this compound. The p-octylphenoxy-, cresoxy- and xylenoxy-propylene oxides, though slightly less active, have the advantage of lower volatility. Other epoxy compounds of lower volatility are available and include glycidyl alpha-naphthyl ether and glycidyl 2-methoxy phenyl ether. Esters of epihydrin alcohol, e. g. the benzoate, can also be used. The epoxy compound may contain more than one epoxy group as in the diglycidyl ethers of catechol and of hydroquinone, the diglycidyl ester of phthalic acid and the triglycidyl ester of phosphoric acid.

Apart from the compounds specified above the invention contemplates the use of other epoxy compounds such as: glycidyl 3-methoxyphenyl and 4-methoxyphenyl and phenyl ethers; the monochlor, dichlor, dimethyl, dimethoxy, monomethyl monochlor, monomethyl monomethoxy, and monomethoxy derivatives of glycidyl phenyl ether; the glycidyl ethers of phenolic carboxylic esters such as methyl salicylate; the diglycidyl ethers of resorcinol and other dihydric phenols, the glycidyl esters of phenyl acetic acid and the diglycidyl esters of terephthalic acid and other acids containing more than one carboxyl group. The epoxy compound may contain keto groups, as for example in p-glycidyl aceto phenone and p-p′-diglycidyl benzophenone. The use of epoxy compounds similar to those referred to above but in which the benzene nucleus is replaced by a cyclohexane or cyclopentane nucleus is also contemplated. Similar compounds derived from homologues of epihydrin alcohol, e. g. 1-hydroxy-3:4-epoxy n-butane, can also be used. Among aliphatic epoxy compounds that can be used besides the diglycidyl ether of diethyleneglycol are other glycidyl ethers of high-boiling alcohols, e. g. the diglycidyl ethers of polyglycols. The preferred epoxy compounds are aromatic ethers and esters of epihydrin alcohol or of its homologues, and especially ethers and esters containing at least one ether or ester group (apart from the epoxy group) per benzenoid nucleus and free from condensed rings and higher alkyl groups.

With a view to avoiding cloudiness in the compositions of the invention, the epoxy compound and any by-products formed from it on heating the compositions, should preferably be soluble in the plasticiser or in the mixture of plasticiser and thermoplastic. Solubility in trichlorethyl phosphate and cellulose acetate is generally reduced by the presence of alkyl groups and of benzenoid nuclei but enhanced by the presence of ether groups, hydroxy groups, keto groups and a moderate proportion of chlorine atoms. In the case, for instance, of glycidyl phenyl ether, it is considered that the effect of the single phenyl group in reducing solubility is overcome by the effect of the epoxy group. It is thought moreover that the stabilising effect of this substance is due to reaction with traces of hydrogen chloride formed by incipient decomposition of the trichlorethyl phosphate to form a monohydroxy monochlor phenyl propane which is soluble in the trichlorethyl phosphate and cellulose acetate, the tendency to insolubility due to the phenyl group being in this case overcome by the effect of the hydroxy group and the chlorine atom. Similar considerations apply in the case of the corresponding tolyl ethers where the increased tendency to insolubility due to a single methyl substituent in the ring is not significant. With the methoxy derivatives and still more with the glycidyl esters this tendency is decreased by the presence of the ether or ester groups. The proportion of benzene nuclei can be increased without leading to insolubility by suitable increase in the proportion of solubility-favouring groups such as ether, ester or keto groups, or chlorine atoms. When condensed rings are present it is difficult to obtain solubiilty and epoxy compounds containing such rings are best avoided where the maintenance of clarity is important.

The epoxy compound should not boil below 150° C. and preferably not below 200° C., and indeed the higher the temperature to which the epoxy compound can be heated without boiling or decomposition the better. Such temperature may, for instance, be from 250 to 350° C., or even higher. The desired low volatility is most easily obtained in compounds containing one or more benzene nuclei but, as indicated above, the multiplication of benzene nuclei may lead to insolubility in the absence of a sufficient proportion of solubility favouring groups. In compounds containing only aliphatic groups the desired low volatility is difficult to attain without loss of solubility. All the glycidyl ethers and esters of alcohols of low molecular weight are unduly volatile and those of long chain alcohols tend to be insoluble both in the plasticiser and in cellulose acetate unless additional groups favouring solubility, e. g. the ether groups of di- and poly-glycols, are present.

Of the specific epoxy compounds referred to, the ethers can, in general, be made by reaction between epichlorhydrin and the appropriate phenol or alcohol and the esters by reaction between epichlorhydrin and the alkali metal salt of the appropriate acid.

The invention includes compositions consisting essentially of trichlorethyl phosphate together with a minor proportion of epoxy compound as well as compositions containing in addition an acid-sensitive thermoplastic, for example cellulose acetate, or other acid-sensitive constituent. The proportion of the epoxy compound relative to the plasticiser may range from 1% or even less to 5% or more by weight according to the degree of stabilisation required and the nature of the particular epoxy compound used. In general 1 to 5%, for example 2 to 3%, of the epoxy compound has been found suitable.

Thermoplastics such as cellulose acetate sometimes contain minute proportions of metals such as iron which appear to catalyse the development of acidity in trichlorethyl phosphate. With a view to inhibiting or reducing any such catalytic effect the compositions of the invention may also contain substances capable of forming complex ions with such metals. One of the most effective of such substances is 2,2'-dipyridyl although this substance may lead to the development of pink colouration which for some purposes is undesirable. Thus a small proportion, e. g. 0.1 to 1% of 2,2'-dipyridyl can be introduced into any of the compositions of Examples I to IV.

The compositions of the invention may also contain small amounts of neutral or weakly alkaline, soluble, long-chain fatty compounds, which appear to increase the stabilising effect, possibly by checking the movement within the thermoplastic composition of ions that catalyse the slight decomposition of the trichlorethyl phosphate responsible for the development of acidity. Thus in the compositions of Examples I to IV a still further improvement in heat-stability can be obtained by introducing a small proportion, e. g. 0.1 to 1% of lead stearate or strontium caprylate.

Instead of cellulose acetate other acid-sensitive thermoplastics, especially other esters of cellulose, capable of plasticisation by trichlorethyl phosphate, may be present in the compositions of the invention. Such thermoplastics include cellulose proprionate, cellulose acetate propionate, cellulose acetate butyrate and cellulose acetate stearate. Other constituents may, of course, be present in the compositions of the invention, for example other plasticisers, volatile solvents and non-solvents, other thermoplastics, dyes, pigments, and other effect materials. Among other plasticisers for cellulose acetate that may be present are other plasticisers capable of dissolving or swelling cellulose acetate in the cold, e. g. dimethyl phthalate, di-(methoxyethyl)phthalate, diethyl phthalate, methyl phthalyl ethyl glycollate and tributyl phosphate as well as plasticisers which are substantially without such effect, e. g. dibutyl phthalate, triphenyl phosphate and tricresyl phosphate. It is often desirable to have present such a plasticiser of limited or negligible solvent power in addition to the trichlorethyl phosphate and any other solvent plasticiser, to obtain a desired degree of stiffness in mouldings made from the composition.

The invention has been described with particular reference to the stabilisation of trichlorethyl phosphate. The invention includes, however, the stabilisation in the same way of other chlorine-containing plasticisers as well as compositions containing such plasticisers together with a minor proportion of the stabiliser, with or without an acid-sensitive thermoplastic, and with or without complex-ion forming substances and/or neutral or weakly alkaline long-chain fatty acid compounds such as are referred to above. Among other chlorine-containing plasticisers are the chlorobutyl and chlorobutoxybutyl esters referred to in U. S. Patent No. 2,525,961, e. g. delta-chlorobutyl acetate, delta-chlorobutoxybutyl acetate and di-(delta-chlorobutyl) phthalate.

The method of the invention can also be used to improve the heat-stability of compounds other than plasticisers, that contain halogen and chlorine attached to adjacent carbon atoms and that tend to lose halogen when kept at temperatures in the range of 100 to 250° C. Among such compounds are halogen-containing polymers such as polyvinyl chloride, polyvinylidene chloride and copolymers of vinyl chloride and of vinylidene chloride and polymers (including copolymers) of chloracrylic esters.

The following example illustrates the use of a p-octyl phenoxy propylene oxide in stabilising a chlorine-containing polymer. All the parts are by weight.

*Example V*

An acetone-insoluble polyvinyl chloride in powder form was compounded on hot rolls (100° C.) with 40% of its weight of tricresyl phosphate and 1% of p-octylphenoxy propylene oxide. The composition was moulded into discs which were tested for colour against similar discs made without the stabiliser. The results (on an arbitrary scale in which the magnitude of the number accorded is proportional to the intensity of the colour) gave figures of 18 and 5 to the discs of the unstabilised compositions respectively.

In this example xylenoxy propylene oxide or cresyloxy propylene oxide can be used instead of the phenoxy body. Similarly, using appropriate plasticisers other halogen-containing polymers can be stabilised by the method of the invention.

The fact that the stabilizers of this invention are useful with vinyl chloride and vinyliden chloride polymers and copolymers is surprising since some of the best of known stabilisers for such polymers, e. g. adipic dihydrazide, basic metallic substances and heavy metal soaps, are either worse than useless with substances such as trichlorethyl phosphate (cf. for instance adipic dihydrazide in Table I) or of little effect.

The products of the invention include moulding compositions, film-forming compositions, moulded products, extruded products, sheets, films (including foils), ribbons and fibres. The invention includes making such products from the compositions of the invention, e. g.: making moulding granules or pellets by processes involving dry-mixing or solvent-mixing of the constituents of the compositions; moulding the compositions by compression-moulding, injection-moulding or transfer-moulding; making articles or materials by extrusion of liquid compositions containing volatile solvent or by hot extrusion of compositions free from volatile constituents; making sheets by the block process and films by casting methods or hot-extrusion methods and making filaments, for instance for rug-making, by wet, dry or melt-spinning processes.

Having described my invention, what I desire to secure by Letters Patent is:

1. A composition comprising cellulose acetate plasticized with tri-(beta-monochlorethyl) phosphate and containing 1 to 5%, based on the weight of the phosphate, of a member of the group consisting of the glycidyl ether of common phenol and the glycidyl ether of p-octyl phenol.

2. A composition comprising cellulose acetate plasticized with tri-(beta-monochlorethyl) phosphate and containing 1 to 5%, based on the weight of the phosphate, of the glycidyl ether of common phenol.

3. A composition comprising cellulose acetate plasticized with tri-(beta-monochlorethyl) phosphate and containing 1 to 5%, based on the weight of the phosphate, of the glycidyl ether of p-octyl phenol.

(References on following page)

References Cited in the file of this patent

UNITED STATES PATENTS

| | | |
|---|---|---|
| 2,181,085 | Alquist et al. | Nov. 21, 1939 |
| 2,221,818 | Slagh et al. | Nov. 19, 1940 |
| 2,371,500 | Britton et al. | Mar. 13, 1945 |
| 2,453,634 | Marple | Nov. 9, 1948 |
| 2,538,072 | Zech | Jan. 16, 1951 |
| 2,555,169 | Voorthius | May 29, 1951 |
| 2,564,194 | De Nie et al. | Aug. 14, 1951 |
| 2,581,464 | Zech | Jan. 8, 1952 |
| 2,585,506 | Shokal et al. | Feb. 12, 1952 |
| 2,590,059 | Winkler | Mar. 18, 1952 |
| 2,670,302 | Malm et al. | Apr. 13, 1954 |
| 2,675,327 | Gearhart | Apr. 13, 1954 |

FOREIGN PATENTS

| | | |
|---|---|---|
| 418,230 | Great Britain | Oct. 22, 1934 |